United States Patent [19]

Kanamori

[11] Patent Number: 4,578,292

[45] Date of Patent: Mar. 25, 1986

[54] RESIN MOLDING DECORATIVE MEMBER

[75] Inventor: Hiroshi Kanamori, Yokohama City, Japan

[73] Assignee: Nissan Motor Co., Ltd., Yokohama City, Japan

[21] Appl. No.: 666,453

[22] Filed: Oct. 30, 1984

[30] Foreign Application Priority Data

Dec. 26, 1983 [JP] Japan ................... 58-251469

[51] Int. Cl.⁴ .............. B60R 13/00; B32B 3/00; B05D 5/06; B05C 9/06
[52] U.S. Cl. ................... 428/31; 428/167; 428/180; 428/187; 428/195; 428/913.3; 427/282; 118/301; 118/504
[58] Field of Search ........... 428/31, 46, 195, 913.3, 428/187, 180, 167; 427/259, 282; 362/330; 427/272; 118/301, 406, 504, 505

[56] References Cited

U.S. PATENT DOCUMENTS

| 682,769 | 9/1901 | Thorpe | 427/266 |
|---|---|---|---|
| 2,014,072 | 9/1935 | Neumann | 118/301 |
| 3,001,062 | 9/1961 | Winkler et al. | 362/330 |
| 3,951,701 | 4/1976 | Csillag | 427/282 |

FOREIGN PATENT DOCUMENTS

| 53-117073 | 10/1978 | Japan | 118/504 |
|---|---|---|---|
| 57-117370 | 7/1982 | Japan . | |
| 57-194078 | 11/1982 | Japan . | |
| 57-194067 | 11/1982 | Japan . | |
| 58-96541 | 6/1983 | Japan . | |
| 58-101754 | 6/1983 | Japan . | |

OTHER PUBLICATIONS

Sweet's 1967 Product Design Catalogue File, vol. 2, 2a/Roh.

Primary Examiner—John E. Kittle
Assistant Examiner—Thomas C. Saitta
Attorney, Agent, or Firm—Schwartz, Jeffery, Schwaab, Mack, Blumenthal & Evans

[57] ABSTRACT

Disclosed is a resin molding decorative member having a back surface formed with intersecting masking jig mounting grooves which define numerous segments separated from each other by the grooves. Also disclosed is a method for providing a desired pattern on the back surface of the member.

6 Claims, 10 Drawing Figures

RESIN MOLDING DECORATIVE MEMBER

BACKGROUND OF THE INVENTION

The present invention relates to a resin molding decorative member which may be used as various kinds of decorative panels, such as rear finisher for an automotive vehicle.

In automotive vehicles, a rear panel mounted between tail lamp units on a rear side of a vehicle body is concealed by a rear finisher so that the outer appearence of the vehicle is improved. Describing further in connection with FIGS. 1 to 4, there are shown a vehicle main body 1, a pair of tail lamp units 2, a rear finisher 3 which conceals a rear panel 4 for decorative purpose. This rear finisher 3 has brackets 5 attached to projected tongues 3a integrally formed on the back surface thereof by numerous sets of bolt and nut 6, and this subassembly is fixedly secured to the rear panel 4 via the brackets 5 by means of numerous sets of bolt and nut 7. Also illustrated in FIGS. 1 and 2 are a tunk lid 8, a trunk floor 9 and a rear bumper 10.

This rear finisher 3 is formed by injection molding from a suitable transparent or coloured transparent resin, such as acrylic resin or polycarbonate resin, and has a back surface formed with a serration with projected tops or streaks extending transversely. This back surface is painted and as a result, these streaks 11 appear within the front surface.

However, this conventional construction of the finisher does not permit more than a single pattern to appear within the front surface, for example a pattern consisting of transversely extending parallel streaks as shown in FIG. 4. When it is desired to differentiate vehicles of the same model in terms of various types, what is allowed to do is to change the colour of paint to be applied on the back surface of the rear finisher 3; however this fails to make as great a change as expected. Thus, if another pattern is required, another finisher with another desired pattern must be prepared, causing a cost increase.

One conventional painting method is disclosed in Japanese patent application provisional publication No. 58-96541.

SUMMARY OF THE INVENTION

An object of the present invention is to provide a resin molding decorative member which allows numerous design patterns to appear without any change in construction thereof.

According to the present invention, a resin molding decorative member has a back surface formed with numerous segments which are separated from each other and surrounded by intersecting masking jig mounting grooves.

DESCRIPTION OF THE EMBODIMENT

Figure 1:
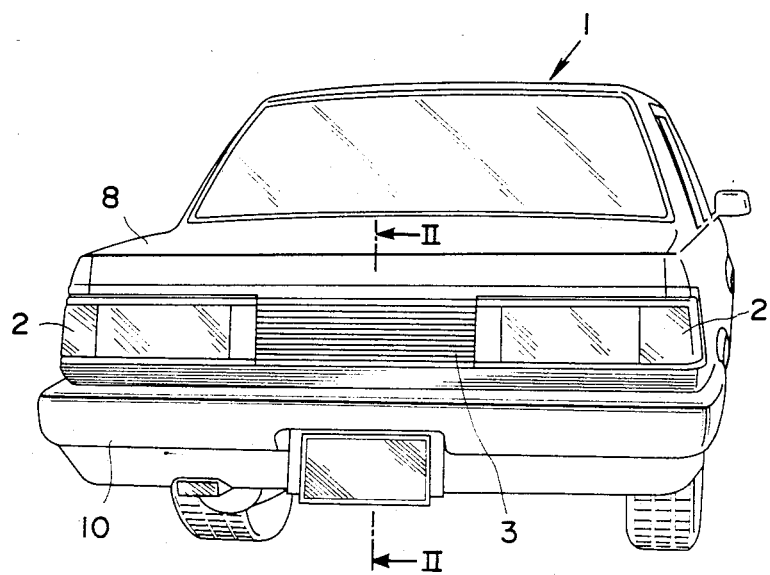
FIG. 1 is a perspective view of an automotive vehicle as viewed from the rear and illustrates the conventional rear finisher as discussed above.
Figure 2:
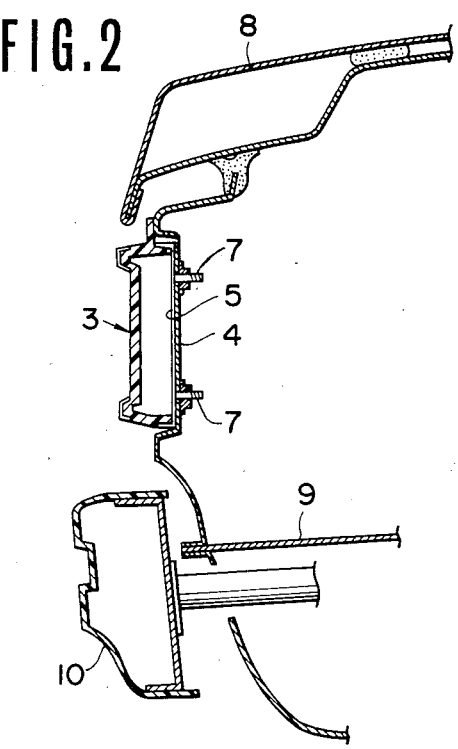
FIG. 2 is a cross section line II—II in FIG. 1.
Figure 3:
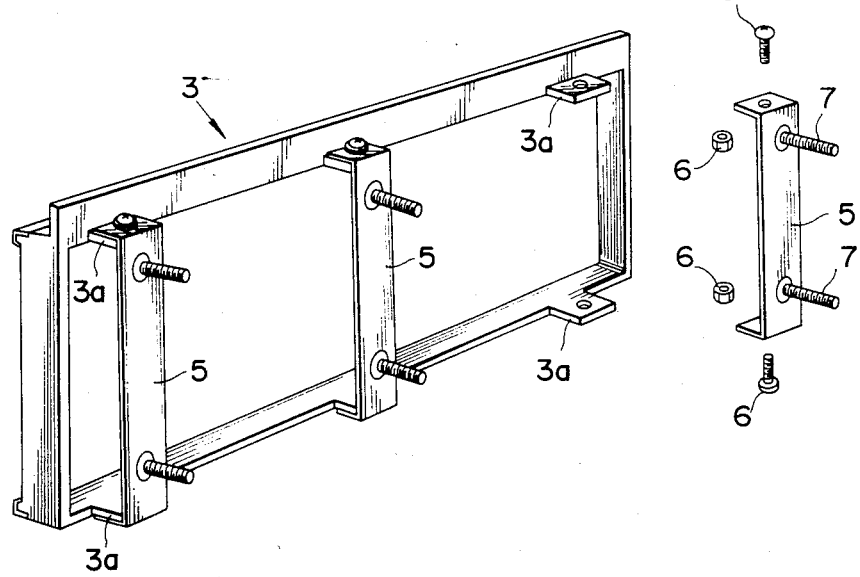
FIG. 3 is an exploded view of the conventional rear finisher as viewed from the rear.
Figure 4:
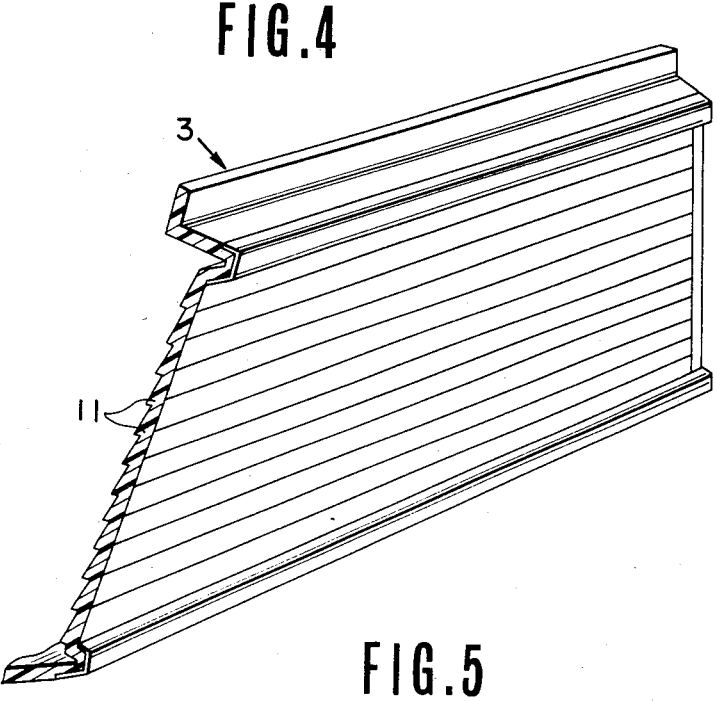
FIG. 4 is a perspective fragmentary view of the conventional rear finisher.

Hereinafter, referring particularly to FIGS. 5 to 7(C) of the accompanying drawings, one embodiment of a resin molding decorative member according to the present invention is described. In the accompanying drawings, like reference numerals are used to designate like parts or portions throughout all of the figures.

Figure 5:
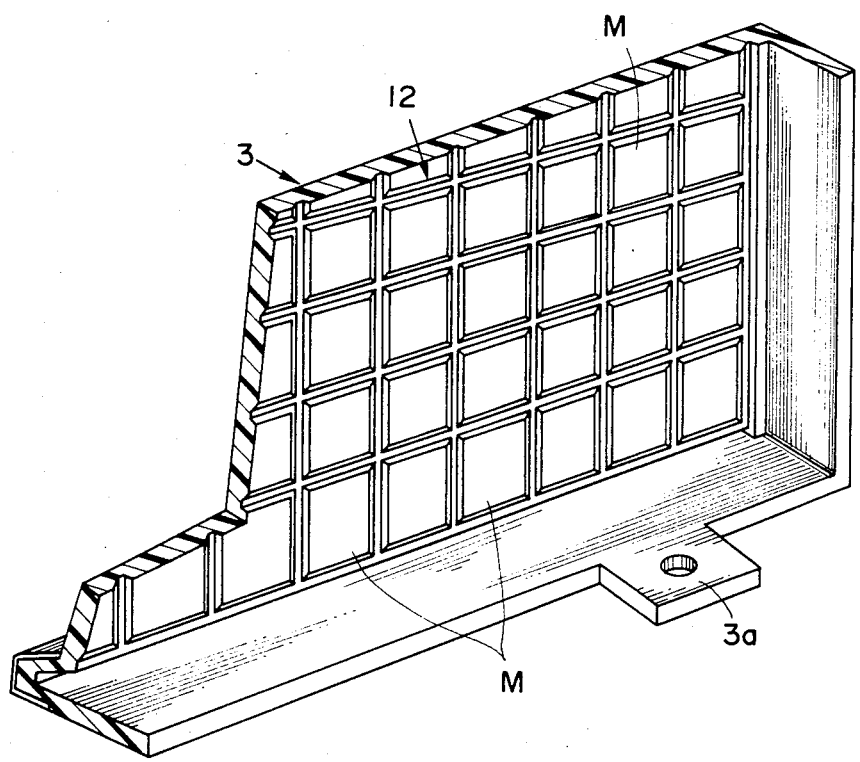
FIG. 5 is a perspective fragmentary view of one embodiment of a resin molding decorative member, according to the present invention, in the form of a rear finisher as viewed from the rear.
Figure 6:
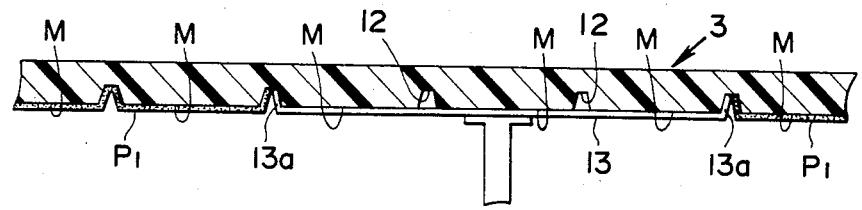
FIGS. 6(A) and 6(B) are sectional views illustrating paint application steps.
Figure 6:
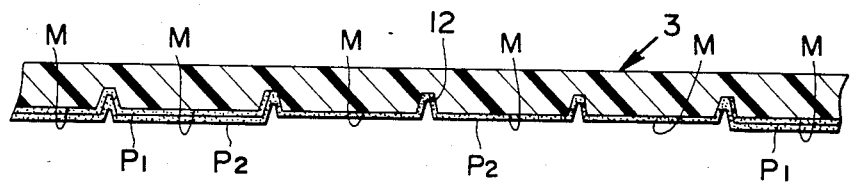
Figure 7:
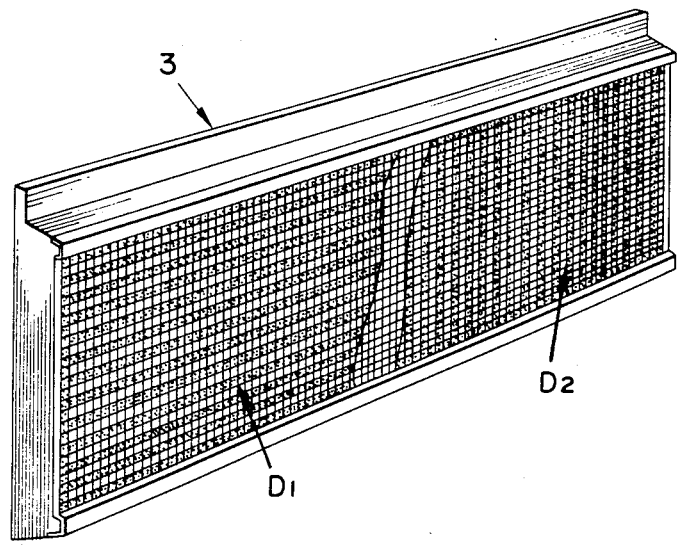
FIGS. 7(A), 7(B) and 7(C) are perspective views showing different design patterns which are allowed to appear by this embodiment.
Figure 7:
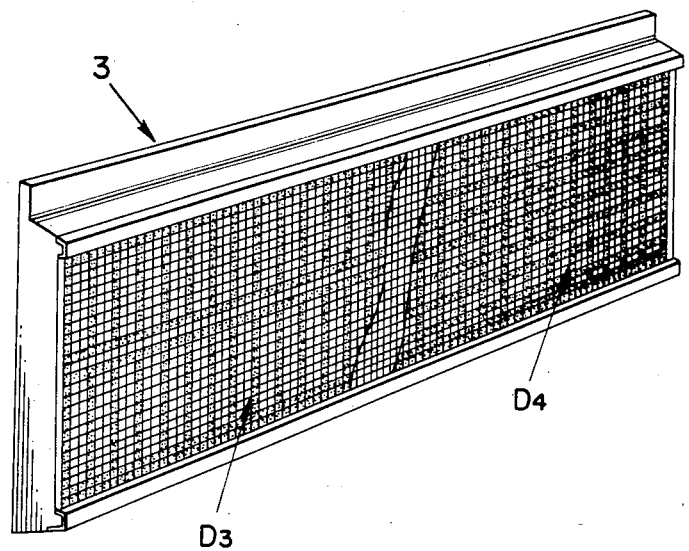
Figure 7:
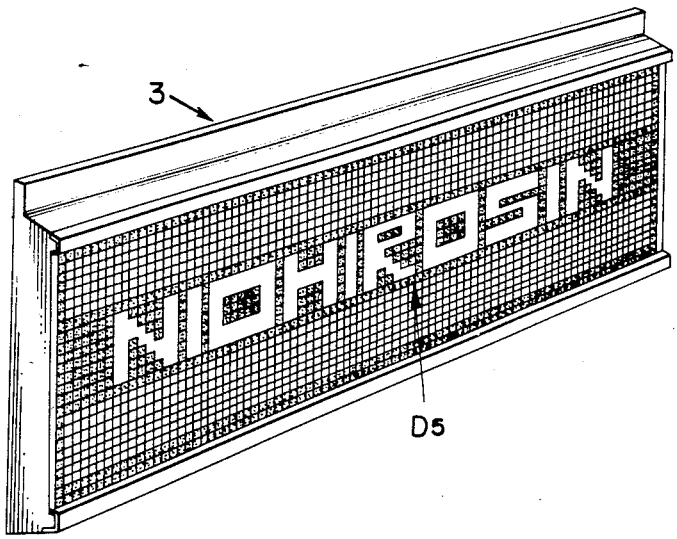

Referring to FIG. 5, a resin molding decorative member in the form of a rear finisher 3 is illustrated. The rear finisher 3 has a back surface formed with numerous masking jig mounting grooves 12 formed on a back surface thereof, which grooves 12 have the same depth and intersect with each to form a checkered pattern and divide the back surface into numerous square shaped segments M. In this embodiment, the grooves 12 form the checkered pattern and a masking jig 13 is fixedly placed on the back surface by engaging end flanges 13a thereof with the grooves 12.

In the application of paint onto the back surface of the rear finisher 3, the masking jig 13, having a desired pattern, is fixedly placed on the back surface with its end flanges 13a engaged with the grooves 12 as shown in FIG. 6(A) and those segments M which are not covered by the masking 13 as painted as shown by a layer P1. After removing the masking 13, those segments M which have been covered by the masking 13 and left transparent are now coated with different colour paint by applying this different colour paint upon the whole area of the back surface as shown by a layer P2 in FIG. 6(B). By painting the whole area of the back surface, the desired pattern appears within the front surface. Since the masking jig mounting grooves 12 have the same depth, the bleeding of paint at the boundary with the masking jig which has been experienced is prevented. It will now be understood that by changing the pattern of the masking jig, a pattern D1 consisting of numerous transversely extending parallel streaks or another pattern D2 consisting of vertically extending parallel streaks as shown in FIG. 7(A) can be produced. It is possible to produce a pattern D3 or a checkered pattern D4 as shown in FIG. 7(B). It is also possible to produce a pattern D5 as shown in FIG. 7(C) including alphabets.

The present invention is not limited to a rear finisher for an automotive vehicle and may find its application in various resin molding decorative members.

As described above, according to the present invention, with the same main body part, various patterns including a pattern with alphabets can be produced. Thus, any desired pattern can be produced with a relatively low cost.

I claim:

1. A resin molding decorative member, comprising a main body of transparent resin which includes:
    a back surface comprising a first set of substantially parallel mounting grooves, a second set of substantially parallel mounting grooves which intersect with said first set of grooves, and a plurality of segments formed between said intersecting grooves, wherein said grooves are designed to engage and fixedly hold a masking jig on said back surface;

a first layer directly applied to a predetermined portion of said back surface comprising a first set of segments selected from said plurality of segments;

a second layer applied to said back surface; and a design pattern formed by said first and second layers comprising at least said first set of segments selected from said plurality of segments and a second set of segments selected from said plurality of segments.

2. A resin molding decorative member as claimed in claim 1, wherein said masking jig mounting grooves have the same depth.

3. A resin molding decorative member as claimed in claim 1, wherein said first and second set of grooves extend at 90° angles to one another to form a checkered pattern.

4. A resin molding decorative member as claimed in claim 1, wherein the surface of said segments is substantially parallel to the front surface of said main body.

5. A method of producing a resin molding decorative member having a desired pattern, comprising the steps of:

forming at least a first set of substantially prallel mounting grooves and a second set of substantially parallel mounting grooves on the back surface of a resin molding decorative member, said first and second sets of grooves intersecting with one another to form a plurality of segments between said grooves;

selectively masking a predetermined portion of said segments by fixedly placing a masking jig on said back surface by engaging said masking jig with said grooves;

applying a first layer to the unmasked portion of said segments;

removing said masking jig; and applying a second layer to said back surface to form a design pattern with said first layer.

6. A resin molding decorative member, comprising a main body of transparent resin which includes:

a back surface comprising a first set of substantially parallel mounting grooves, a second set of substantially parallel mounting grooves which intersect with said first set of grooves, and a plurality of segments formed between said intersecting grooves, wherein said grooves are designed to engage and fixedly hold a masking jig on said back surface;

a first layer directly applied to a predetermined portion of said back surface comprising a first set of segments selected from said plurality of segments;

a second layer applied to said back surface; and a design pattern formed by said first and second layers comprising at least said first set of segments selected from said plurality of segments and a second set of segments selected from said plurality of segments, when produced by the method of claim 5.

* * * * *